US006734383B1

(12) United States Patent
Calcoen et al.

(10) Patent No.: US 6,734,383 B1
(45) Date of Patent: May 11, 2004

(54) METHOD AND DEVICE FOR SORTING PRODUCTS ACCORDING TO EMITTED LIGHT

(75) Inventors: Johan Calcoen, Leuven (BE); Jan Cuypers, Brussel (BE); Nathalie Debaes, Aarschot (BE); Carlo Janssens, Londerzeel (BE)

(73) Assignee: Barco Elbicon, naamloze vennootschap (BE)

( * ) Notice: Subject to any disclaimer, the term of this patent is extended or adjusted under 35 U.S.C. 154(b) by 0 days.

(21) Appl. No.: 09/926,793

(22) PCT Filed: Jun. 21, 2000

(86) PCT No.: PCT/BE00/00068

§ 371 (c)(1),
(2), (4) Date: Dec. 20, 2001

(87) PCT Pub. No.: WO01/00333

PCT Pub. Date: Jan. 4, 2001

(30) Foreign Application Priority Data

Jun. 28, 1999 (BE) .......................................... 9900446

(51) Int. Cl.[7] .......................... B07C 5/342; G01N 21/25

(52) U.S. Cl. ....................... 209/577; 209/579; 209/639; 209/939; 356/417

(58) Field of Search ................................ 356/317, 318, 356/417; 250/458.1, 459.1, 461.1, 461.2; 209/577, 579, 580, 581, 638, 639, 644, 643, 938, 939, 932

(56) References Cited

U.S. PATENT DOCUMENTS 3,197,647 A * 7/1965 Fraenkel ..................... 250/225
3,545,610 A * 12/1970 Kelly ......................... 209/579
3,770,112 A * 11/1973 Asfour ....................... 209/557
3,773,172 A * 11/1973 McClure et al. ............ 209/565
4,634,881 A * 1/1987 Billion .................. 250/559.45
4,795,651 A * 1/1989 Henderson et al. ......... 426/456
5,206,699 A * 4/1993 Stewart et al. ................ 356/30
5,683,000 A * 11/1997 Low ........................... 209/585
5,808,305 A * 9/1998 Leidecker et al. ....... 250/341.8
5,862,919 A * 1/1999 Eason ........................ 209/577
6,060,677 A * 5/2000 Ulrichsen et al. ........... 209/577
6,080,950 A * 6/2000 Jalink ......................... 209/577
6,313,423 B1 * 11/2001 Sommer et al. ............ 209/587

FOREIGN PATENT DOCUMENTS

GB 2 292 455 A * 2/1996

* cited by examiner

*Primary Examiner*—Donald P Walsh
*Assistant Examiner*—Joseph Rodriguez
(74) *Attorney, Agent, or Firm*—Bacon & Thomas, PLLC

(57) ABSTRACT

A method for sorting products including the steps of conveying the products in a product stream, scanning the products in the product stream casting light onto the products on the basis that certain products will emit light, observing emitted light from the products, making a selection of certain products from the product stream as a function of the observed light, and separating certain products from the product stream as a function of the selection. A device is provided that is arranged to sort the products according to the method of the invention and includes a light device that is arranged to cast light onto products and an observation device that is arranged to observe light emitted from the products. A selection device is also provided that is arranged to make a selection of whether to separate certain products from the product stream observed by the observation device.

35 Claims, 4 Drawing Sheets

METHOD AND DEVICE FOR SORTING PRODUCTS ACCORDING TO EMITTED LIGHT

BACKGROUND OF THE INVENTION

The present invention concerns a method and a device for sorting products.

It is meant in particular for removing certain products from a product stream.

In particular, it aims a method and a device which is very suitable to be applied in the food industry, for example for sorting out non-food products from certain foods, in particular leaves, branches and pieces of waste such as wood, plastic, stones, etc.

However, the products to be sorted can also be foods of different quality, whereby a quality selection is made by means of the sorting. The method can also be used to separate good and bad products.

It is known from the international patent application WO 96/00621 to illuminate the products to be sorted with a light beam and to subsequently carry out a selection on the basis of the light which is collected by means of reflection, fluorescence or such. The collected light is treated in a spectroscopic analysis device which delivers an output signal for the selection as a function of the analysis. As use is made of a spectral analysis, whereby the entire spectrum has to be analysed every time, this system is very expensive since it requires a spectroscopic analysis device.

A method is known from the international patent application WO 97/42489 to determine the ripeness of seeds by means of the fluorescence of the chlorophyll in the seeds, after they have been illuminated. The described method makes it possible to shine light through the seeds one after the other, but it does not offer a practical embodiment for the treatment of large amounts at once. Moreover, the described method only leads to a selection among seeds, but it does not go in the direction of selecting strange products from foodstuff or such.

A method for sorting particles is known from the patent application GB 2.292.455, whereby the particles to be sorted are irradiated with a laser and the obtained 'Raman scattering' is used as a sorting criterion. As exposed in GB 2.292.455, normal Raman scattering is disadvantageous in that the signal obtained by means of 'scattering' is disturbed too much by the 'emission' obtained by means of fluorescence, and thus becomes difficult to detect. That is why it is suggested in GB 2.292.455 to make use of a stimulated Raman signal. However, this technique is in turn disadvantageous in that a high energy supply is necessary, requiring expensive equipment.

BRIEF SUMMARY OF THE INVENTION

In general, the invention aims a method and a device which make it possible to carry out a very efficient and reliable selection in a large product stream, such that the sorting can be applied at an industrial level for the treatment of large quantities of products.

In particular, according to a number of preferred embodiments, it aims a method and a device whereby the use of expensive spectrographical analysis equipment is excluded, and whereby large quantities can be treated.

To this aim, the invention in the first place concerns a method for sorting products, characterised in that it at least consists in conveying the products to be sorted in the shape of a product stream, extending in the width, over a specific path; in scanning the products to be sorted over the width of said product stream, by casting light onto the products on the one hand, at least in a specific spectrum which is selected such that certain products of the products to be selected will emit light, and by observing this light in a specific range of the spectrum in which the emitted light is cast on the other hand; in making a selection between the scanned products as a function of the observed light; and in automatically separating the products from the above-mentioned product stream as a function of said selection.

By making use of a wide product stream which is scanned over the width on the one hand, and by making use of emitted light on the other hand, it is possible to make a particularly fast and efficient selection with great certainty and with a minimum of faults, such as opposed to for example the above-mentioned known systems, as well as the systems which are available on the market, whereby the selection is exclusively made on the basis of reflected light, in particular by means of colour recognition.

By making use of a spontaneous 'emission', by which is mainly implied 'fluorescence' as will be further explained, the effect which is felt as being disadvantageous according to GB 2.292.455, will be used as an essential characteristic according to the invention to carry out the selection. This effect is particularly useful when sorting specific foods, whereby Raman scattering does not offer an efficient solution.

Preferably, in order to observe the light which is emitted by the products concerned, use is made of an optical filtering, in particular by means of an optically adjusted filter, for example a band-pass filter. This allows for an almost instant evaluation and selection of the scanned products, as opposed to the relatively complicated and expensive spectral analysis which is applied in the method described in WO 96/00621.

The selection is preferably made on the basis of a certain intensity value of the emitted light or of a signal corresponding to it being either exceeded or just not exceeded. As use is made of the emission in a specific spectrum, there is a very clear distinction between signals which are related to a light-emitting product and signal which are related to a non-light-emitting product, which makes it possible to make a very efficient distinction by simply verifying whether the signals either or not exceed a certain value.

In particular, the light is preferably cast from such a part of the spectrum that light is emitted by the products concerned in another part of the spectrum. This makes it easy to make a distinction between the emitted light and possibly directly reflected light by means of an optical band-pass filter or such.

According to the most practical embodiment according to the invention, use is made of the fluorescence qualities for the emission, in particular the fact that the scanned products either or not fluoresce.

More in particular, the method will be used for sorting chlorophyll-containing foods, in particular for the selection of strange products from foods.

The invention is particularly useful for separating waste from for example peas, especially for separating strange products therefrom such as stones, pieces of wood, plastic and such.

In the case where the method is applied for separating waste from products containing chlorophyll, such as for example peas, light is preferably emitted during the scanning having a wavelength in the order of magnitude of 640 to 680 nanometer, whereas other light is preferably excluded. Thus, only the foods containing chlorophyll, in this case the peas, start to emit light in the spectrum to be observed as a result of fluorescence. This wavelength selection can also be used for other foods containing chlorophyll, such as beans, lettuce, sprouts, etc.

In order to observe the emitted light, observations are preferably exclusively made in the wavelength range of 690 to 740 nanometer, preferably by means of optical filtering, and in particular in a range which has a value in the order of magnitude of some 715 nanometer. In this range, the emission can be optimally observed.

According to another application of the invention, use is made for the emission of the light-emitting quality of certain organisms such as bacteria, fungi and such, which can be found on certain products, whereby a selection is made between the products on the basis of said emission.

A practical application thereof according to the invention consists in sorting foods which are affected by fungi from non-affected foods, in particular in sorting nuts or figs which are affected by aflatoxins. Preferably, there will be an excitation with deep blue UV light (340 to 400 nm). The observed emitted light will then be green. Preferably, measurements will only be carried out in the wavelength range of 440 to 550 nm in this case.

According to a major variant of the invention, use is made of a background which will emit light when it is being illuminated, in particular which will fluoresce, such that the light being cast will also produce an emission effect in those places where it is not cast on a product. This offers the advantage that it becomes possible to make a simple selection between light-emitting and non-light-emitting products without any special measures being required to prevent that those places where there is no product and which are observed during the scanning are regarded as places where strange products to be removed are found.

Use is preferably made here of an emitting background of a surface extending in the width of the product stream which is spherical on the side where the light is cast upon. The spherical shape promotes a very precise emission.

Practically, the above-mentioned background will consist of a cylindrical roller.

According to a special embodiment, instead of using a background which emits light after light has thus been cast upon it, use can also be made of a background which constantly emits light, preferably of a wavelength which is ideal in relation to the selection to be made.

As for the emitting background, a background is preferably provided which emits light having a wavelength of the same order of magnitude as the light which is emitted by the products to be treated.

In order to be able to obtain high emission values with a minimum of energy, and consequently to be able to make observations with great certainty, the scanning according to the invention is preferably carried out by means of a laser, in particular by making a laser beam move diagonally over the product stream in a systematic manner.

According to a very advantageous embodiment, a scanning system with a moving mirror, preferably a rotating polygon mirror or another optical element is used, and the emitted light is returned via the same mirror or the same optical element.

Instead of making use of a laser, the scanning can also take place in another way, for example by means of a fixed light band or a series of light points, directed onto the products which pass by over the width of the product stream, whereby at least the emitted light is observed by means of a camera, and whereby the selection is made on the basis of the evaluation of camera images.

In order to make the products move in the shape of a product stream with a certain width along the place where they are scanned, use can be made of different techniques. A practical technique consists in bringing the products in a single plane on the place where they are to be scanned, via a table, belt or such, either or not provided with longitudinal ducts or grooves.

Further, the products preferably fall down freely and the products to be separated are moved apart by means of nozzles which are erected over the width of the product stream and which are individually activated as a function of the observations made, whereby for example the products to be removed from the global product stream are blown away and are collected in a recipient.

In order to further optimise the method, the products to be sorted can be scanned from two sides, situated opposite to the product stream. This makes it possible to make a right selection with more certainty, which is particularly important when there is a possibility that products show different qualities on the front and on the back side.

It should be noted that the method of the invention can possibly be combined with another scanning process, for example with a colour sorting by means of the reflected light. In the latter case, different laser beams can be used, namely at least one laser beam to realise the above-mentioned emission in a different spectrum, and at least one laser beam for sorting for example on the basis of the normal light reflection. Practically, the different laser beams can then be simultaneously guided along the same light path according to the invention, possibly slightly shifted in relation to one another. As a result, only one polygon mirror or another optical element will be required to move the laser beams over the product stream.

Apart from the above-mentioned method, the invention also concerns a device for sorting products according to the method, characterised in that it at least consists of the combination of means for conveying the products to be sorted-in the shape of a product stream extending in the width over a certain path; means for scanning the products to be sorted over the width of said product stream, consisting of means to cast light on the products on the one hand, at least in a specific spectrum which is selected such that specific products to be sorted will emit light, and of means to observe this light in a specific range of the spectrum in which the cast light is emitted, on the other hand; means to make a selection between the scanned products as a function of the observed light; and means to automatically separate the products from the above-mentioned product stream as a function of said selection.

BRIEF DESCRIPTION OF THE DRAWINGS

In order to better explain the characteristics of the invention, the following preferred embodiments are described as an example only without being limitative in any way, with reference to the accompanying drawings, in which.

DETAILED DESCRIPTION OF THE INVENTION

Figure 1:
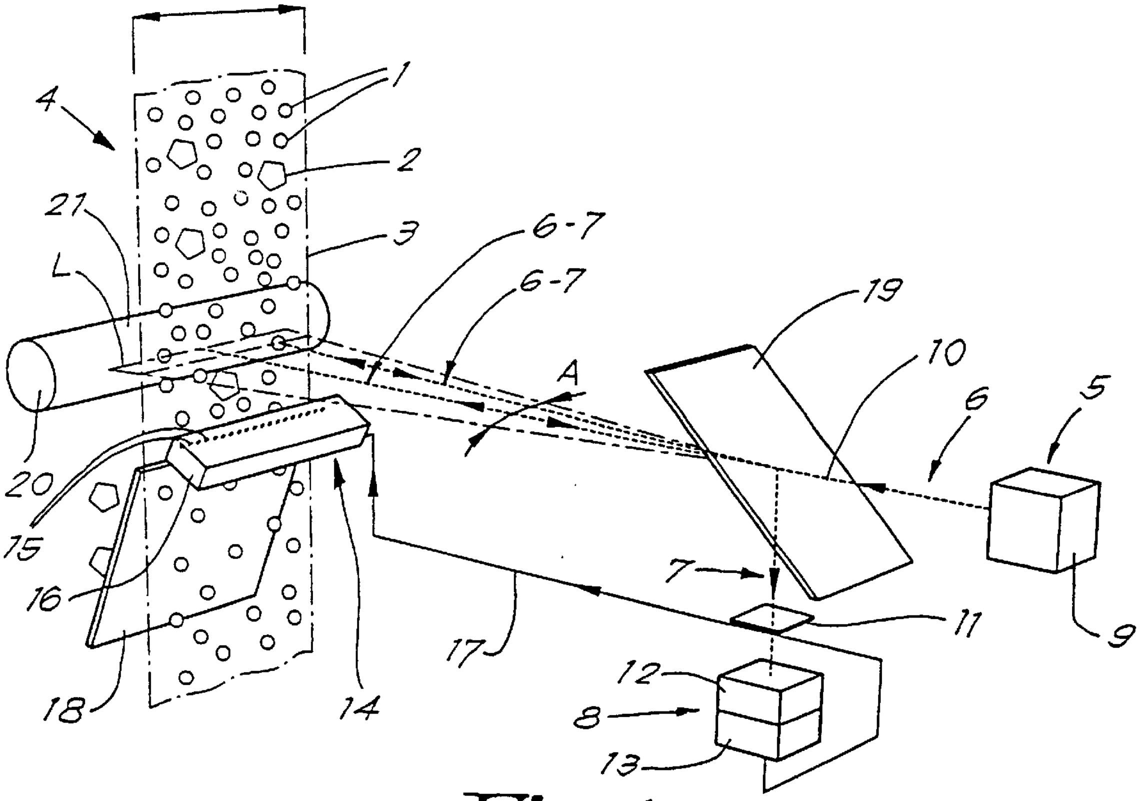
FIG. 1 schematically illustrates the method according to the invention.

FIG. 1 schematically represents how the products 1–2 to be sorted are conveyed over a certain path 3 in the shape of a product stream 4 which extends in the width, in particular a certain width B. The products 1–2 are hereby schematically represented as good products 1, for example peas or other products containing chlorophyll, and the products 2 to be removed, for example strange elements such as stones, pieces of wood and plastic.

According to the invention, the product stream 4 is scanned by casting light 6 on the products 1–2 with the help of appropriate means 5 on the one hand, at least in a specific spectrum which is selected such that specific products to be sorted, in this case the products 1, emit light 7, whereas the other products 2 don't, and by observing the light 7 with the help of appropriate means 8 in a specific range of the spectrum in which the emitted light 7 is emitted on the other hand.

The means 5 hereby consist of a light source 9, preferably a laser which emits the light 6 in the shape of a ray of light, namely a laser beam 10, as well as means to systematically turn the laser beam 10 over an angle A which are not represented here, such that the product stream is scanned over the width B, in particular on the place of the line part L.

The means 8 consist of an optical filter 11 on the one hand which mainly exclusively lets the light 7 through from the spectrum range in which the emission takes place, and of a detection device 12 to observe said light 7 on the other hand.

Further, FIG. 1 schematically represents means 13, such as an electronic processing unit, to make a selection between the scanned products 1–2 as a function of the observed light 7, also as a function of the place on the line part L where said light 7 came from.

In order to automatically separate the products 1 and 2, means 14 are provided which in this case consist of nozzles 15 which can be individually activated and which are controlled by means of a valve unit 16 which is not further described here, as a function of the signals 17 coming from the above-mentioned processing unit. The means 14 also comprise a partition 18.

It is clear that the necessary means are further provided to separate the cast light 6 and the emitted light 7 in an appropriate manner, for example by means of a semi-transparent mirror 19, as is schematically represented.

Finally, another element 20 is represented in FIG. 1 having a surface 21 which forms an emitting background. As explained in the introduction, it preferably consists of a cylindrical roller.

The method according to the invention consists in that light 6 is cast having at least such a wavelength that one of either products 1–2, when it is irradiated by the light 6, spontaneously starts to cast or emit light at another wavelength than that of the light 6 with which it is irradiated.

In the case where the products 1 consist of peas or other products containing chlorophyll, in particular foods, light 6 from the spectrum of 690 to 740 nanometer will be cast.

As a result thereof is obtained that when the laser beam 10 hits a product 1, in particular a pea, light 7 is emitted. The same occurs when the laser beam 10 hits no product 1 or 2 whatsoever, whereby in this case light having practically the same wavelength is emitted due to the fluorescence of the surface 21.

If, however, the laser beam 10 hits a product 2, such as a stone or such, there will be no fluorescence, and hence no light 7 will be emitted.

By moving the laser beam 10 at a sufficiently high speed over the width B, for example at 12,000 cycles per minute, all products 1–2, which fall down freely in the given example, can be scanned without any problems.

Figure 2:
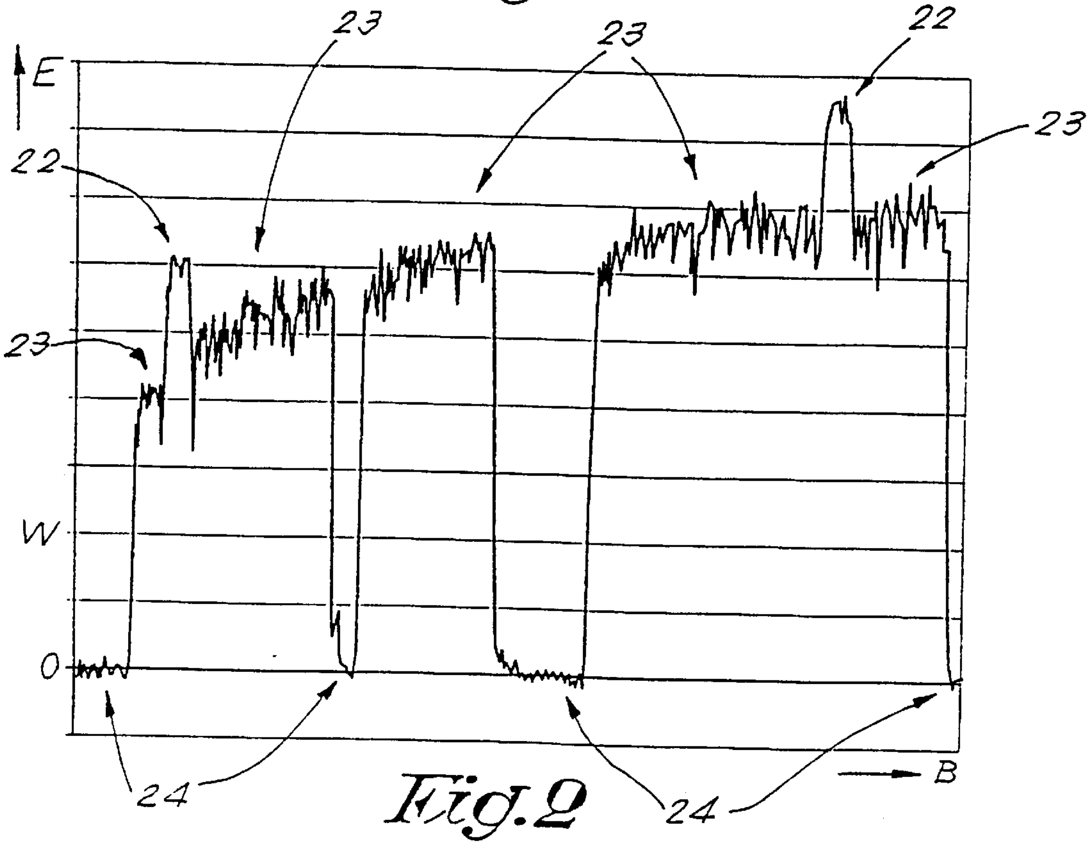
FIG. 2 represents an example of a signal which is obtained during the scanning of the products concerned.

As a result, light 7 is observed which, after being transformed, results in an electric signal E, such as represented for example in the diagram of FIG. 2, whereby this signal is measured out as a function of the above-mentioned width B. The parts 22 of the signal progress are hereby the result of the emission occurring with a product 1, in particular a pea, whereas the parts 23 are the result of the emission at the surface 21. The parts 24 indicate that products 2 are present which cause no emission.

Subsequently, in the means 13 forming the processing unit, an automatic selection is carried out to detect the places where the products 2 pass, on the basis of the above-mentioned signal progress. As explained in the introduction, this is preferably done on the basis of a certain value of the above-mentioned signal being either or not exceeded, in particular by checking when the signal goes beneath a certain limit value W in the case of FIG. 2. It is clear that, each time the signal goes beneath said value W, this means that a product 2 is being observed.

In order to efficiently remove the products 2, one or several nozzles 15 are activated, on the place where the product 2 is found, so that each such product 2 is blown out of the product stream 4, in particular behind the partition 18. As they are blown away, it may happen that a number of products 1 are also removed from the product stream 4, but since the quantity of products 2 usually is very small in relation to the quantity of products 1, also the good products 1 which are blown out of the product stream 4 will be limited in number.

FIGS. 3 to 6 hereafter represent a possible practical construction of a device 25 for realising the above-mentioned method in further detail.

Figure 3:
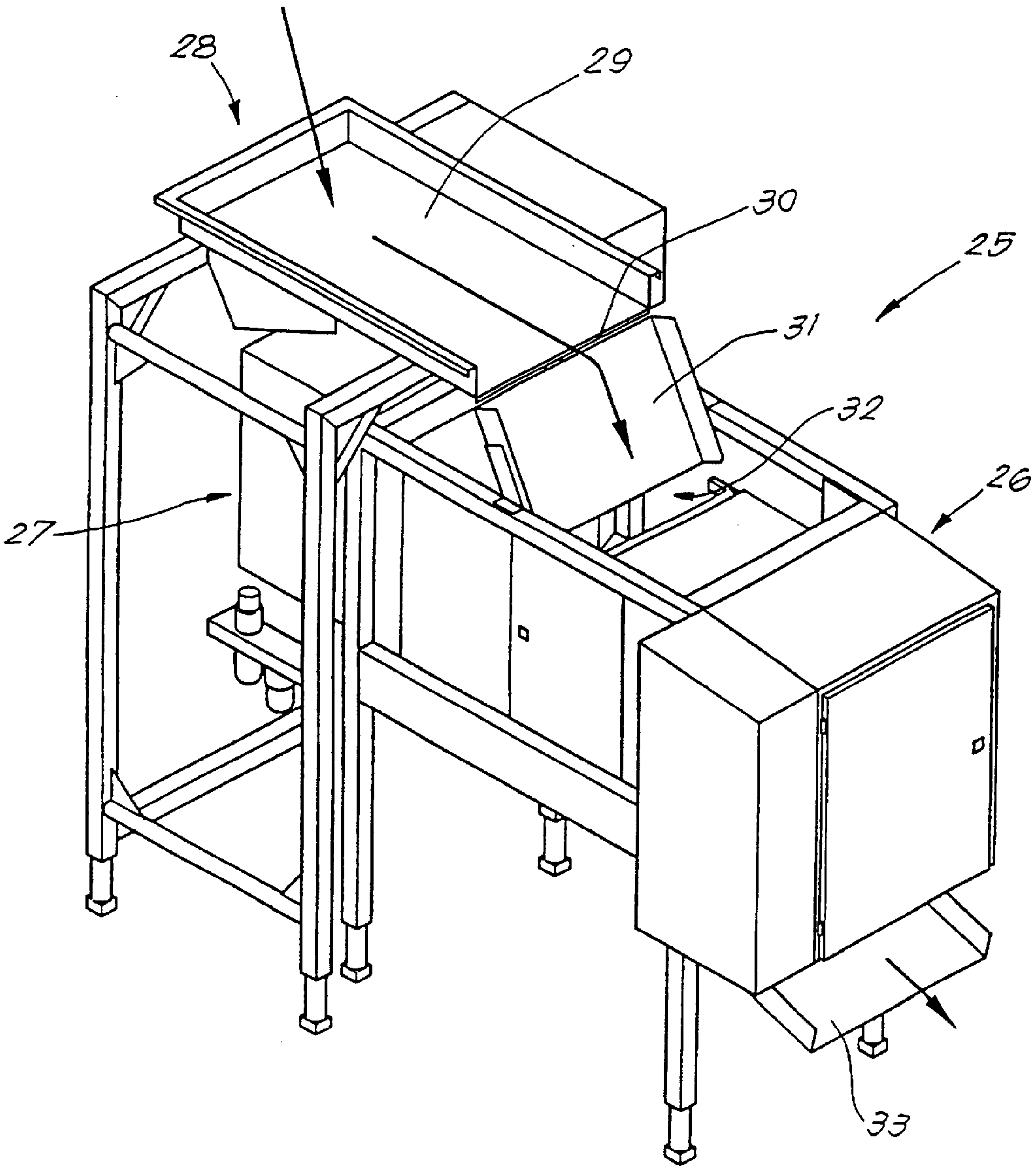
FIG. 3 represents a device according to the invention in perspective.
Figure 4:
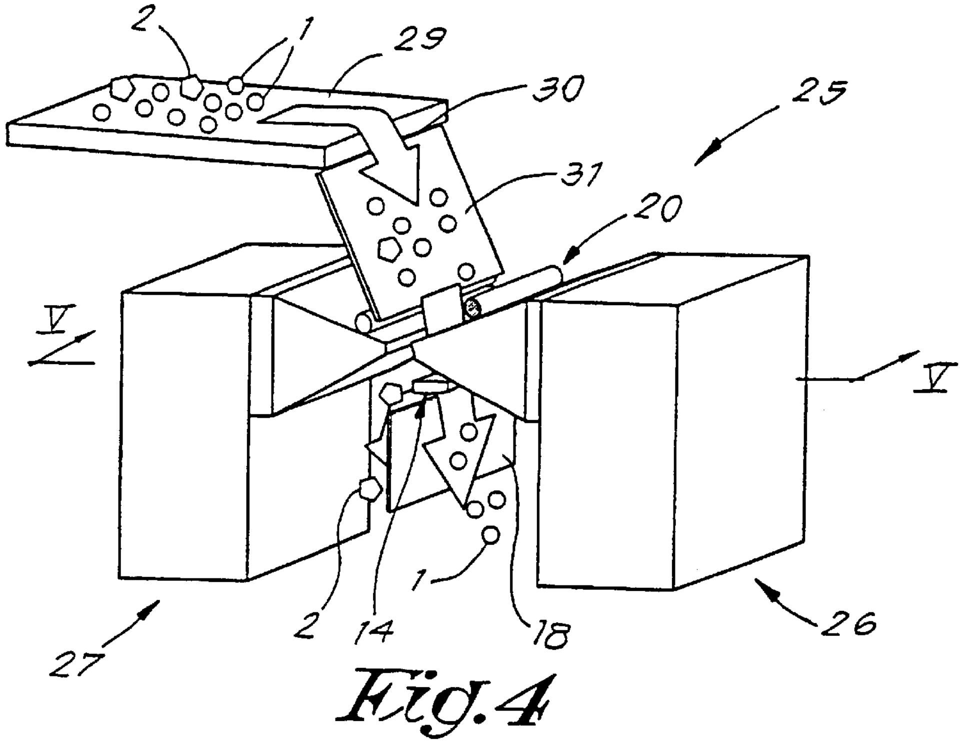
FIG. 4 schematically represents the device of FIG. 3.
Figure 5:
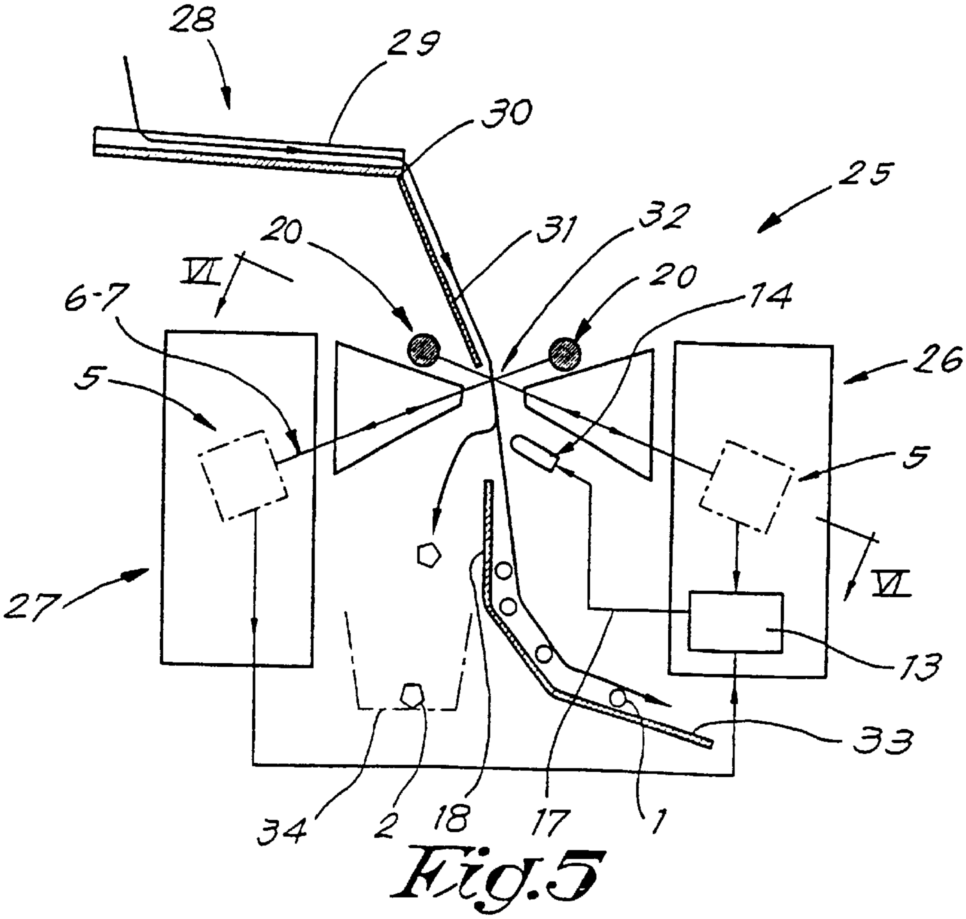
FIG. 5 represents a section according to line V—V in FIG. 4.

FIG. 3 shows the device 25 as a whole. This device 25 is equipped with two optical units 26 and 27 which, as is schematically represented in FIGS. 4 and 5, make it possible for the products 1–2 to be scanned on either side. Every unit 26, 27 respectively, has a construction as is schematically represented in FIG. 1, as well as in FIG. 6 which will be described hereafter.

In order to carry the products 1–2 in the shape of a product stream 4 with a certain width but with a small thickness past the place where they are scanned, a device 25 is equipped with means 28 in the shape of a vibrating table 29, from where the products 1–2 are vibrated downward over the edge 30 of this vibrating table 29. Via a sliding surface 31 they are guided into a zone 32, where they fall down freely and where they are also scanned, as mentioned above.

The products 1 which have been let through are guided further via a discharge chute 33, whereas the removed products 2 are collected in a recipient 34 or such.

It is clear that, according to a variant, instead of a vibrating table 29, use can also be made of a conveyor belt or such. Also longitudinal ducts or grooves can be provided in the vibrating table to obtain different parallel rows of products 1–2 falling down, whereby for example each row passes exactly one nozzle 15.

Figure 6:
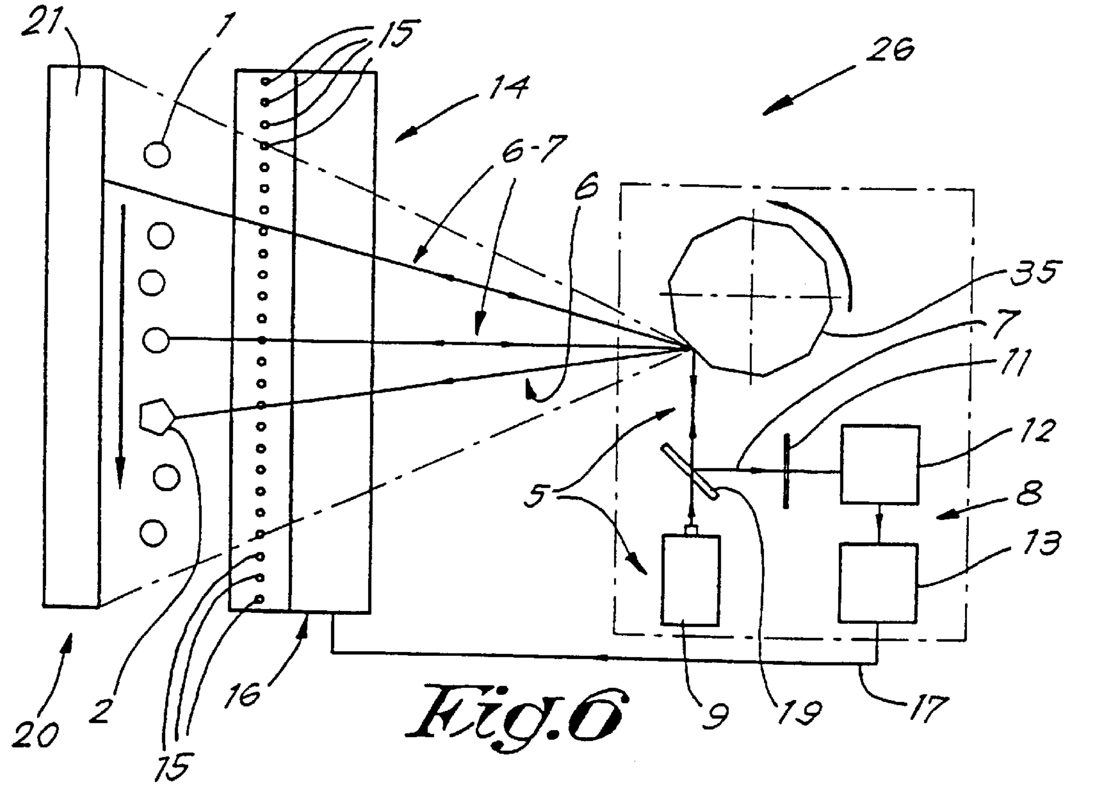
FIG. 6 schematically represents a section according to line VI—VI in FIG. 5.

FIG. 6 further schematically represents how the cast light 6 and the emitted light 7 which is caught again by means of a moving mirror 35, in particular a rotating polygon mirror, can be moved over the width B of the product stream 4.

Figure 7:
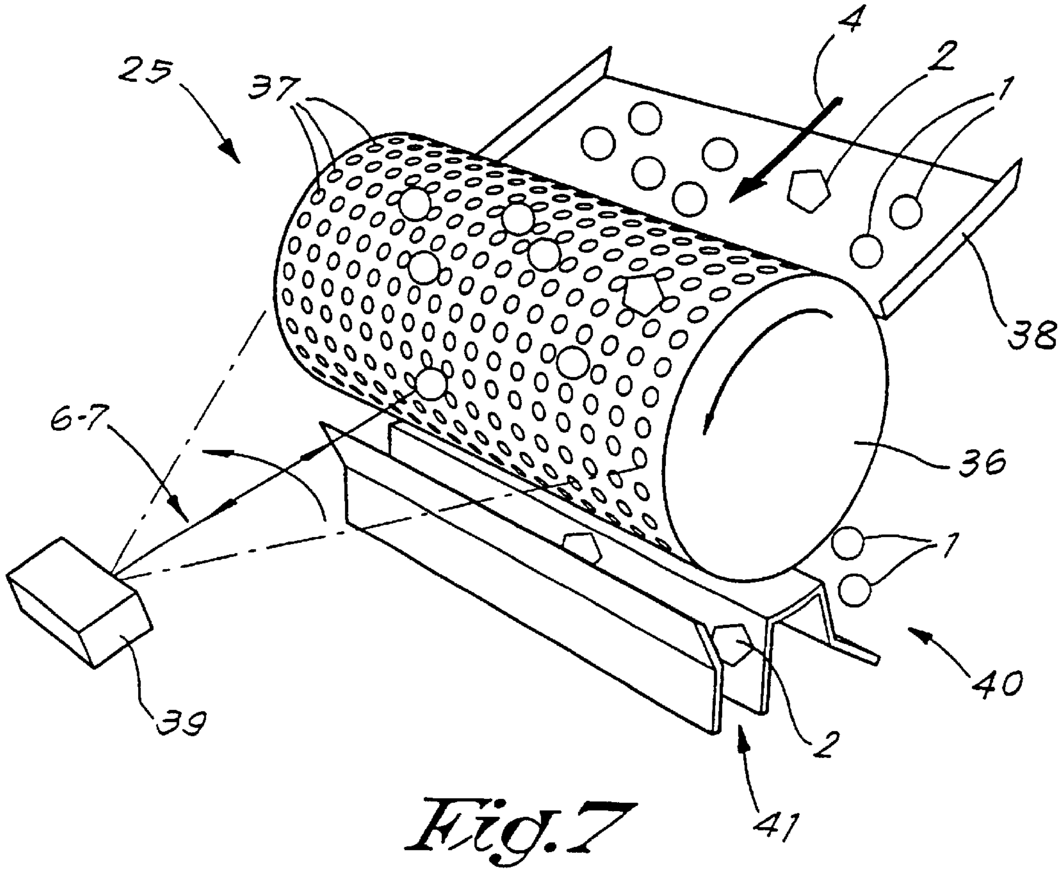
FIG. 7 schematically represents a variant of a device according to the invention.

FIG. 7 represents a part of a special embodiment of a device 25 according to the invention. The means for conveying the products 1–2 to be sorted in the shape of a product stream 4 over a certain path hereby mainly consist of a drum 36 which is provided with inlets 37 on its surface against which the products 1–2 are sucked, by creating a vacuum in an appropriate manner. The means for automatically making a separation as a function of the selection in this case consist of means which are not represented, in particular valves or such, which make it possible to selectively control the inlets 37 concerned, in particular to close or to open them.

The working is then mainly as follows: the product stream 4 is for example brought into contact with the surface of the drum 36 via a feed chute 38. Thanks to the suction force on the inlets 37, products 1–2 are sucked onto the surface of the drum 36, as a result of which the product stream 4 so to say continues on the surface of this drum 36.

Then, the products 1–2 are scanned by means of an optical unit 39, analogous to that of the preceding embodiment.

The surface of the drum 36 may hereby either or not consist of a light-emitting material, with the same purpose as the surface 21 of the above-mentioned element 20.

By providing two ducts 40 and 41 for the separate discharge of the products 1–2 and by interrupting the sucking action on the respective inlets 37 as a function of the data obtained by means of the scanning, it is possible to carry out a separation. Above the duct 41, the inlets 37 holding products 2 are closed, such that the sucking action is interrupted and that these products 2 fall in the duct 41. Above the duct 40, the suction action of all inlets 37 is interrupted, such that all the products 1 there come loose of the drum 36.

It should be noted that, as opposed to what is schematically represented in FIGS. 1 and 4 to 7, the width B is in reality a considerable number of times the diameter of the product 1–2. In reality, this width will usually be in the order of magnitude of 0.3 to 1 meter, but of course it can also deviate therefrom. Further, the product stream 4 in reality consists of a quantity of products 1–2 spread out over almost the entire surface of the path 3.

The invention is by no means limited to the above-described embodiments represented in the accompanying drawings; on the contrary, such a method and device can be made in all sorts of variants while still remaining within the scope of the invention.

What is claimed is:

1. A method for sorting products, comprising the steps of:

conveying the products to be sorted in the shape of a product stream extending in a path width over a specific stream path;

scanning the products to be sorted over the path width f said product stream by casting light onto the products and onto a background element with a fluorescent surface, at least in a specific spectrum which is selected on the basis that certain products of the products to be selected and the fluorescent background will emit light;

observing the emitted light in a specific range of the spectrum in which the light is emitted;

making a selection between the scanned products as a function of the observed light; and automatically separating the products from the above-mentioned product stream as a function of said selection.

2. The method according to claim 1, wherein optical filtering-by means of an optically adjusted filter is used to observe the light emitted by the products.

3. The method according to claim 1, wherein the selection is made on the basis of reaching a certain intensity value of the emitted light or of exceeding a signal corresponding to the emitted light.

4. The method according to claim 1, wherein light is cast from such a part of the spectrum that light from another part of the spectrum will be emitted from the products concerned.

5. The method according to claim 4, wherein use is made of fluorescence qualities for the emission so as to determine whether the scanned products fluoresce.

6. The method according to claim 1, further comprising the step of sorting chlorophyll-containing foods to distinguish non-food products from the food products.

7. The method according to claim 6, further comprising the step of selecting waste from peas.

8. The method according to claim 1, wherein light is emitted during the scanning and has a wavelength on the order of magnitude of 640 to 680 nanometers.

9. The method according to claim 1, wherein the observed emitted light is in a range which has a value on the order of magnitude of 715 nanometers.

10. The method according to claim 1, wherein the light-emitting quality of certain organisms is used as a criteria for the selection of the products.

11. The method according to claim 10, wherein the sorted products are nuts affected by aflatoxins and nuts not affected by aflatoxins.

12. The method according to claim 1, wherein the observed emitted light is within the spectral range of 690 to 740 nanometers.

13. The method according to claim 1, wherein the background is a surface that extends along the path width of the product stream and spherical on the side where the light is cast upon.

14. The method according to claim 13, wherein the background comprises an element in the shape of a cylindrical roller.

15. The method according to claim 1, wherein the background is configured to constantly emit light.

16. The method according to claim 1, wherein an emitting background is provided and emits light having a wavelength of the same order of magnitude as the light which is emitted by the products to be treated.

17. The method according to claim 1, wherein a laser is used to scan the products.

18. The method according to claim 17, wherein the step of scanning includes moving a laser beam diagonally over the product stream in a systematic manner.

19. The method according to claim 18, wherein a scanning system with a rotating polygon mirror is provided to scan the produce stream, and the emitted light is returned via the rotating polygon mirror.

20. The method according to claim 1, wherein the scanning takes place by means of a fixed light band or a series of light points directed onto the products which pass by over the width of the product stream, whereby at least the emitted light is observed by a camera.

21. The method according to claim 1, wherein the products are brought in a single plane on the place where they are to be scanned via a table.

22. The method according to claim 21, wherein the table vibrates and is provided with longitudinal grooves or ducts.

23. The method according to claim 1, wherein the products to be sorted are scanned from two sides, situated opposite to the product stream.

24. The method according to claim 1, further comprising the step of sorting the products on the basis of light reflection.

25. The method according to claim 24, wherein different laser beams are used and simultaneously guided along a same light path.

26. The method according to claim 25, wherein the different laser beams are shifted in relation to one another.

27. The method according to claim 1, wherein the products fall down freely and the products to be separated are moved apart by means of nozzles erected over the width of the product stream and activated individually or in groups as a function of the observed emitted light.

28. A device for sorting products, comprising:

a conveying device arranged to convey the products to be sorted in the shape of a product stream extending in the path width over a certain path;

at least one background element with a fluorescent surface;

a scanning device arranged to scan products to be sorted over the path width of said product stream including a light device configured and arranged to cast light on the products and on the background in at least a specific spectrum selected such that specific products to be sorted and the background will emit light, and an observation device configured to observe the light in a specific range of the spectrum in which the light is emitted;

a selection device configured and arranged to make a selection between the scanned products based on a selection criteria as a function of the observed light; and a separation device configured and arranged to automatically separate the products from the product stream on the basis of the selection criteria.

29. The device according to claim 28, wherein the light device includes a laser generating a laser beam and an optical device arranged and configured to make the laser beam move in the path width over the product stream.

30. The device according to claim 28, wherein the observation device includes an optical collector arranged and configured to collect the emitted light and guide it to the selection device for carrying out the selection, the optical collector having an optically adjusted filter.

31. The device according to claim 28, wherein the conveying device includes a vibrating table upon which the products are placed and are subsequently vibrated away over an edge thereof.

32. The device according to claim 28, wherein the separation device includes a series of nozzles activated as a function of the selection criteria and the separation to be realised.

33. The device according to claim 28, wherein the conveying device includes a drum provided with inlets on its surface against which the products are sucked, and in that the separation device includes a selection device arranged and configured to selectively control the inlets.

34. The device according to claim 28, wherein the scanning device includes at least one element background forming a light-emitting background.

35. The device according to claim 34, wherein the background element includes a cylindrical roller.

* * * * *